Fig_1

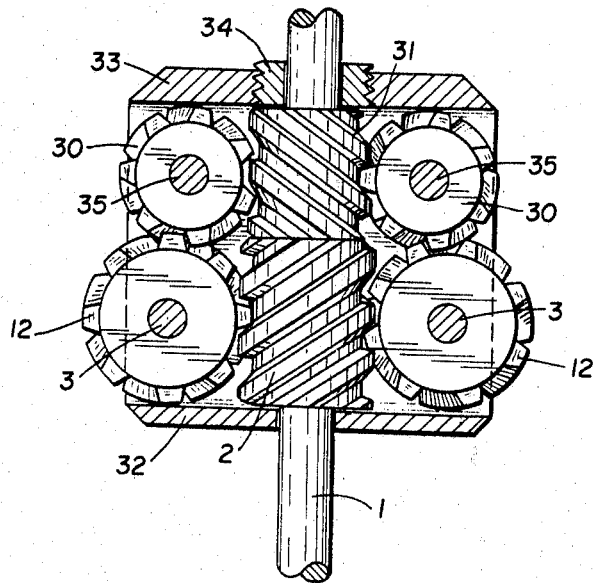
Fig_3
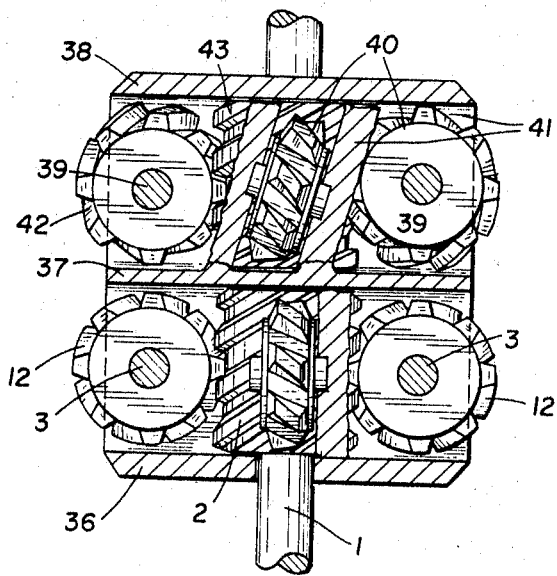
Fig_4
INVENTOR.
HARRY E. NOVINGER

United States Patent Office 3,442,156
Patented May 6, 1969

3,442,156
INFINITELY VARIABLE SPEED
GEAR TRANSMISSION
Harry E. Novinger, 1 Parkway Drive,
Englewood, Colo. 80110
Filed Mar. 7, 1966, Ser. No. 535,639
Int. Cl. F16h 57/10
U.S. Cl. 74—793                    17 Claims

ABSTRACT OF THE DISCLOSURE

This invention pertains to the use of gear mechanisms for steplessly varying the speed of an output shaft from neutral rotation to higher ratios of rotation relative to the rotation of an input shaft. The input shaft drives a conical drive gear having an internal surface comprised of curved teeth of uniform size and equidistantly spaced throughout their lengths. An output gear unit is variably located within the conical drive gear and consists of a helical gear fixed to the output shaft and a plurality of helical gears mounted about the gear fixed to the output shaft. The drive gear and the output gear unit are supported at variable angles in respect to each other so as to maintain mesh between a portion of the plurality of helical gears and the drive gear that result in steplessly varying the ratio of turn of the output shaft from neutral to aproximate that of the drive gear.

---

This invention relates to power transmission equipment and more particularly to a mechanism for producing infinitely variable speed changes in a power transmission system.

The need for a simple, steplessly variable speed changing device has been desired in transportation and industry, such as, in automobiles, trucks, machine tools, textiles and many others. All prior known variable speed devices are attended by serious drawbacks such as slippage, stepped ratio changes, losses in heat, large size, high cost of manufacture, and general inefficient use of power input.

Therefore, it is the essential object of this invention to avoid these drawbacks. With this object in view, the present invention provides means for gradually varying the geared ratio of turn between an input or driving shaft and an output or driven shaft so as to accelerate, decelerate and neutralize motion of the output shaft within any desired and controlled range of speed variation and load for which designed and without slippage.

It is a further object of this invention to provide a speed changing mechanism that will permit the more effective and efficient use of internal combustion engines and gas turbine engines when operated in varying load and power configurations and particularly at full throttle, torque, speed or combination thereof.

The device is characterized in that relative rotation of the input, utilizing some power source, and output mechanisms is obtained from a new and novel application of curves of double curvature gear teeth and helical gear assemblies interacting with a manual or governed positioning of one mechanism relative to the other.

As will emerge from the following descriptions and accompanying drawings representing exemplary but non-exclusive forms or embodiments of the invention, the acceleration, deceleration, and neutralization of motion of this gear transmission can be achieved within any desired range of the speed variation without slippage, wherein:

FIG. 3 and FIG. 4 are longitudinal sections through the driven drives of alternative driven mechanisms with parts broken away and parts in elevation.

Like parts are designated by like characters throughout the specification and the drawings.

Figure 1:
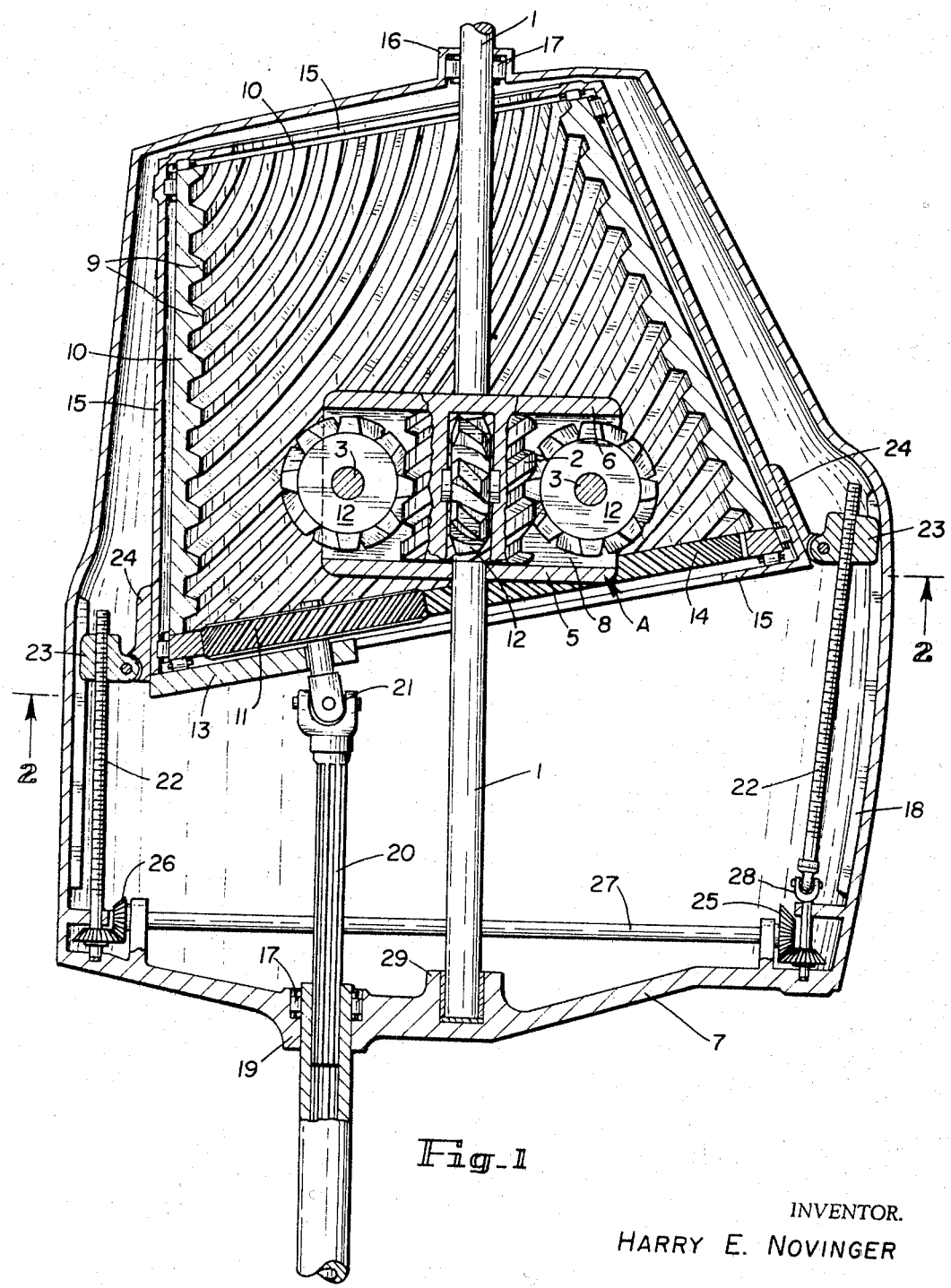
FIG. 1 is a longitudinal section through the driving and driven drives with parts broken away and parts in elevation.

Part 1 may be considered as a driven shaft. Fixed to it or made integral with it is an external gear 2, having teeth cut on a helix, normally known as a helical worm gear.

Positioned freely upon shaft 1, so it may under certain circumstances rotate with respect to shaft one, is a carrier or container A which, in the particular form here shown, comprises two web-like portions 5, 6, positioned freely upon opposite sides of gear 2, and bearing upon two sides or portions of gear 2, and bearing upon two sides or portions of shaft 1. Extending radially and joining each of the web-like portions 5, 6, are transverse webs 8; and each of the webs 8 is perforated to receive a shaft 3.

Upon each of the shafts may be mounted a driven helical gear 12. The number of driven gears 12 is not limited to the number shown but may be used in any number required for design balance. Preferably, as shown in FIG. 1, these gears have a plurality of teeth. As the gears are free to rotate on the shafts, they may be considered a plurality of idler gears or idler worms. As shown, each of them meshes with gear 2. The complete driven system may be known as a driven assembly or unit.

Bearings and washers have been omitted in most illustrations for simplicity. Their omission does not mean their use is impossible. For the same reason some oil seals and oil inlets have been omitted.

7 designates generally any conventional form of hollow housing in which the gearing assemblies forming this invention are enclosed.

10 designates a form of the body of the driving gear, which is a shape having a surface disposed between two or more circles of different diameter each lying in separate planes, a form of which may be substantially as illustrated. The inner surfaces of driving gear body 10 are, as illustrated here, provided with gear teeth 9. Conveniently, these teeth may extend over the total of the periphery of the inner surfaces.

Gear 10 is driven through splined drive shaft 20, it being splined and carrying universal joint 21, positioned by bearing-carrying arm 13, to align and change lengths with the arcurate movements of 10 as it revolves within frame 15. Shaft 20 may conveniently extend through housing 7 supporting 20 at flange 19 about oil seal 17. Helical gear 11 drives gear 10 through helical gear 14 secured to gear 10. The complete power driving system may be known as a driving assembly or unit.

The shaft 1 is exteriorly splined, as at 4, so as to be rotated without slippage by gear 2. Shaft 1 further may conveniently extend through housing 7 having a flange 16 about oil seal 17. The housing 7 may be of any design fitted for compactness, strength and oil retaining. It is stationary and is perforated as at 29 to receive shaft 1.

As shown, the helix angle of the plurality of idler gears 12 and external gear 2 is such that they are reversible; that is, the helix angle is steep enough to permit rotation about their axes in either direction.

One of the basic inventions of this invention embodiment is the utilization of curves of double curvature gear teeth so as to obtain a uniform size and equidistant spacing between consecutive teeth throughout their lengths so that gears 12 mesh with or engage by gears 12 at any point along their lengths, and to obtain a disposed pattern of gear teeth permitting a graduated change of the plane of rotation of driving gear 10 to the plane of rotation of carrier A, thus rotating gear 12 due to the sideward thrust of gears 12 while tracking in parallel engagement circles on gear 10 and thereby changing the rates of speed of the driven shaft 1 in respect to driving gear 10. The term "plane of rotation" means a plane perpendicular to the axis of rotation of the object being cited. More clearly described, the shapes of gear teeth 9 commence at the smaller end of gear 10 aligned straight, then immediately realign to parametric curves, then immediately taking on circumferential shapes from the perimeter of the surface of gear 10 resulting in a physical presentation as curves of double curvature, continuing equidistantly spaced throughout their lengths. Thus, the helix angle of the teeth 9 become increasingly steeper relative to the axes of gear 10 beginning at the smaller end and increasingly toward the larger end.

In operation, the ratio of the relative rotation between shaft 20 and shaft 1 changes as the longitudinal and angular positioning of carrier A changes with respect to gear body 10. As previously stated, the angular change of carrier A to gear 10 imparts varying gear speed changes to driven gear 2, mounted on shaft 1, while maintaining at all times by virtue of the constant of the gear teeth a positive mechanical connection between the driving and driven shafts. As shown more clearly in FIG. 2, the teeth of two or more of gears 12 are continuously held in mesh with the teeth 9 by shaft 1, housing 7, and carrier 15. The alignment of gear 10 with respect to carrier A is arcuately maintained to continuously keep gears 12 and 9 tracking and meshed with parallel gear teeth surfaces. The arcuate movement of 10 is through threaded yokes 23 movably secured to carrier 15 by brackets 24 and to housing 7 by guideways 18. Screws 22 are powered from common source 27 through gear 25, universal joint 28, and gear 26. As will be readily apparent from FIG. 1, gear 25 has a larger diameter than 26 so that common source 27 will activate one side of carrier 15 a greater amount than the other side so as to move along guideways 18 in an arcuate movement.

The common source 27 may obtain its power by intermittant manual or graduated governor, means already well known to the art of actuating and controlling forward and reverse motions. Automatic means for controlling 27 is particularly desirable due to the capability of this invention to provide infinitely variable speed changes in main power streams; thus, greatly increasing the efficiency of reciprocating engine power by operating at high brake means effective pressures at both low and high r.p.m.; and making possible more efficient applications of gas turbine engines by allowing them to operate at their higher r.p.m.

In practice, when carrier A is located in a position near the smaller end of gear 10, the plurality of idler gears 12 do not rotate about their axes due to the balance of torque on opposite sides of gears 12 in mesh with gear 10, and, hence, carrier A and driven shaft 1 rotate together in the direction of gear 10. In this position and in positions closer to the smaller end of gear 10, the highest relative speeds of shaft 1 to gear 10 are obtained. In positions approaching the larger end of 10, the thrust on gears 12 gradually changes with the angle of change between the planes of rotation of carrier A and gear 10, whereby, gears 12 rotate gear 2 at a progressively and infinitely slower rate to gear 10 until the position is reached where shaft one is stationary or neutralized. In these positions the forward rotation of carrier A continues and the rotation of gears 12 about their axes increases as shaft 1 decreases.

FIG. 3 illustrates an alternative means for similar operation of carrier A and the driven gear. This means includes the basic driven gear assembly 5–6–8–12 in combination with a plurality of gears 30, coaxially located about gear 31 and shaft 1. Gears 12 drive idlers 30, being engaged and aligned with 30. Gears 30 are smaller and have a lesser number of teeth than gears 12. Gears 30 and 31 have teeth disposed in the opposite hand to 12 and 2. Gears 30 are mounted on shafts 35 which are parallel to shaft 3. Carrier 32, 33 is constructed similarly to carrier A except for gear alignment screw 34.

Operationally, although gear 30 never engages driving gear 9, their addition to the system increases the maximum horsepower capability of right angle helical gear technique; thereby increasing the horsepower capability of this invention. This novel arrangement also decreases the requirement for extreme pressure type thrust bearings in right angle helical gear operation.

FIG. 4 illustrates a further alternative means for driven gears 12 and carrier A. This means includes the basic gear assembly 5–6–8–12 in combination with another similarly disposed assembly coaxially mounted. Structural differences between the two assemblies are: Gears 40 and gear 43 have teeth cut at an angle of small variance steeper to the angle of the cut of 12 and 2; gears 40 may, therefore, rotate about their axes 39 in planes of rotation at variance in respect to the planes of rotation of 12; and the diameter of each gear 40 may be increased by one gear tooth or decreased by one gear tooth in respect to each gear 12, as required by the increased slope of the tooth cut upon gears 40; and, as gear 43 may retain the same number of teeth as gear 2, its diameter may slightly increase in respect to gear 2.

Carrier 36–37–38 is constructed similarly to carrier A having web-like portion common to and separating each of the pluralities of idler 12 and 40.

Figure 2:
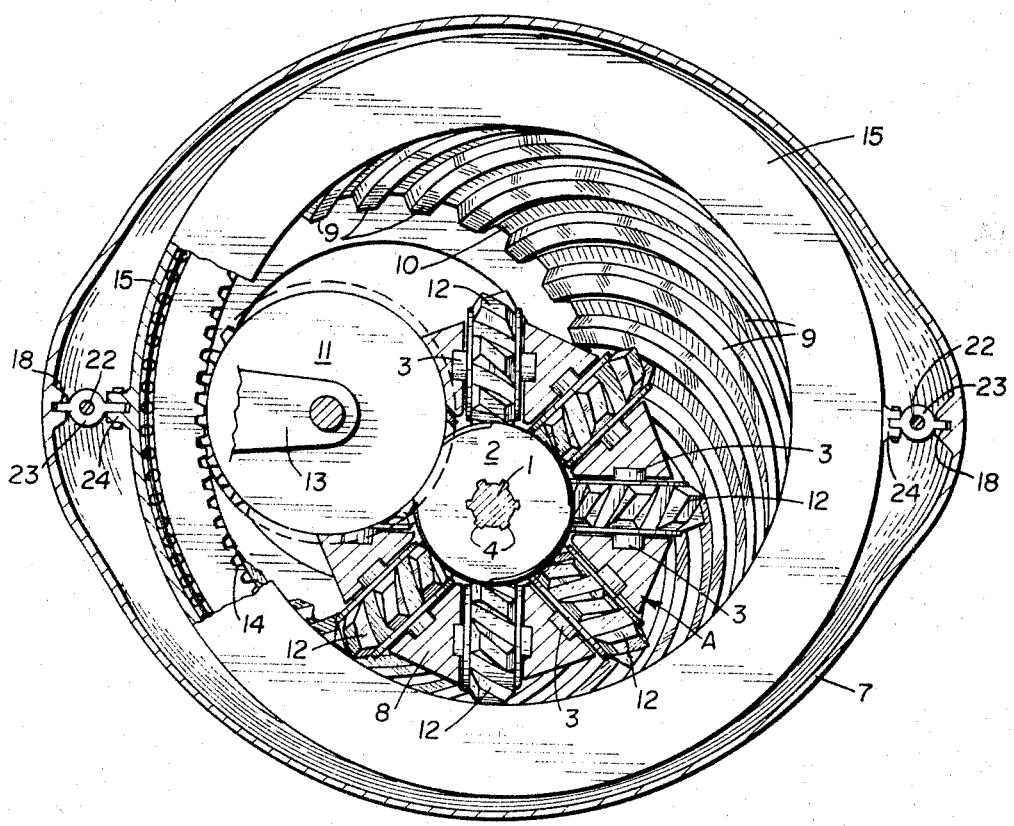
FIG. 2 is a transverse section taken at line 2—2 of FIG. 1, with some parts in section and with others broken away.

Both pluralities of gears 12 and 40 are disposed about their respective external helical gears 2 and 43, and both pluralities have portions of each simultaneously engaged and in mesh with teeth 9 of gear 10 at all times. This combination gear assembly and shaft 1 are further disposed at variance to the basic gear assembly 5–6–8 as illustrated in FIGS. 1 and 2 by having a slight tilt in direct relationship to the slight difference in size of the gears 40 and 43 compared to the size of gears 12 and 2 so as to be equally engaged with gear teeth 9.

In operation, the variance of the planes of rotation of driven gears 40 to the planes of rotation of driven gears 12 provides gears 40 displaced ratios of speeds between gear 10 and shaft 1 which is equal to the ratios of gears 12 to gear 10 and shaft 1, and therefore effectively operating as one single ratio changing unit having the purpose of substantially doubling the maximum horsepower capability of the driven unit.

This invention may be further developed within the scope of the attached claims. Accordingly, the foregoing description should be read as merely illustrative of an operative embodiment of this invention and not in a strictly limiting sense.

I now claim:

1. In an infinately variable speed gear transmission, a driving shaft, means for connecting a driving gear thereto, said driving gear having the shape of a surface lying between circles of different diameter and in different planes, and a driven shaft, means for connecting a driven gear unit thereto, means for movably supporting said driving gear and said driven gear unit in mesh and at varying longitudinal positions and at varying angles with respect to each other, said angles changing with each change of longitudinal position for steplessly varying the ratio of turn between the driving and driven shafts.

2. An infinitely variable speed gear transmission, a driving shaft, means for connecting a driving gear thereto, said driving gear the surfaces thereof disposed between parallel circumferences of different size diameter lying in different planes, and a driven shaft, means for connecting a driven gear unit thereto, said driven gear unit and said driving gear being disposed so as to make contact and to have a portion of their teeth engaged at all times, means for changing the relative longitudinal positions and angles of planes of rotation of said driving gear and said driven gear unit wherein said angles of planes of rotation changes with said changes of longitudinal positions so that the speed of the driven shaft is progressively varied with respect to the speed of the driving shaft.

3. The invention as defined in claim 2, and wherein said driving gear has teeth curved in a manner to maintain equidistant spacing thereon, and said driven gear unit comprising a coaxial carrier positioned on said driven shaft for rotation in respect to said driven shaft, a gear fixed to said driven shaft and idler gears positioned upon said carrier for meshing and engaging with said driving gear and said gear fixed to said driven shaft.

4. The invention as defined in claim 1, and wherein said driving gear equipped with curved gear teeth in their length dimension, said curves of the teeth shaped in a manner to maintain equidistant spacing throughout their lengths, an idler carrier positioned coaxially with said driven shaft, said driven shaft free to rotate with and in the opposite direction thereto, and said driven gear unit comprising a gear fixed to said driven shaft and a plurality of idler gears mounted upon and for rotation with respect to said idler carrier for meshing and engaging with said driving gear and said gear fixed to said driven shaft.

5. The invention as defined in claim 3, and wherein said driving gear teeth are shaped with curves of double curvature and of uniform tooth size throughout their lengths whereby said driving gear teeth curve in decreasingly smaller angles relative to the plane of rotation of said driving gear, said idler gears having teeth cut in a helix angle whereby changes of relative longitudinal position of said driving gear and said driven gear unit produce changes in the relative angles of the planes of rotation between said driving gear and said co-axial carrier, and said changes in relative angles of the planes of rotation causing a progressively variable ratio between said driving shaft and said driven shaft.

6. The invention as defined in claim 4, and wherein said curves of the gear teeth of the driving gear being curves of double curvature and having uniformity of tooth size throughout their lengths, said driving gear teeth curving in increasingly steeper angles relative to the plane of rotation of said driving gear, said plurality of idler gears being helical gears, the axes of rotation of said helical gears differing from said idler carrier whereby a varying of the angle of engagement of said driving gear and driven gear unit will result in infinite speed changes between said driving gear and said driven gear unit.

7. In an infinitely variable speed gear transmission, a driving shaft, means for connecting a driving gear thereto, said driving gear being equipped with long curved teeth following longitudinally and around the surface of the driving gear in curves of double curvature shapes while maintaining uniformity of tooth size and in a manner to maintain equidistant spacing throughout their lengths, said driving gear teeth curved in increasingly steeper angles relative to the plane of rotation of said driving gear and said angles steepest approximate to the large end of said driving gear, said surface of said driving gear lying between perimeters of circles of different diameters and in different parallel planes, and a driven shaft an idler carrier positioned about and coaxially upon said driven shaft for rotation with and in the opposite direction in respect thereto, the angle between the planes of rotation of said driving gear and said idler carrier increasing with the increasing angle of curve of said driving gear teeth, a driven gear comprising a plurality of helical idler gears mounted upon and for rotation with respect to said idler carrier, the rotation planes of said helical idler gears differing from the rotation plane of said carrier, a portion of said plurality of helical idlers in mesh and engaged with the teeth of said driving gear, an external helical worm gear fixed on said driven shaft and in mesh with the plurality of said helical idler gears, means for maintaining said driving gear and said helical idler gears in mesh, means for changing the relative longitudinal positions and rotational plane angles of said driving gear and said idler carrier, said rotational plane angles changing with each change of longitudinal position to cause a controlled alignment of driving and driven gear teeth and infinitely variable change of speed ratios between said driving gear and said driven shaft.

8. The invention as defined in claim 7, and wherein said driving gear rotatably secured to said driving shaft, arcuate movements being caused by said means for changing the relative positions of the driving gear and idler carrier, said arcuate movements establishing a controlled alignment of gear teeth between said driving gear and said driven gear while changing the rotational plane angle relationship between said driving gear and said idler carrier causing infinitely variable speed ratios between the driving and driven shafts.

9. The invention as defined in claim 8, and wherein said helical idler gears free to rotate at right angles to said external helical worm gear, said idler carrier comprising web-like portions positioned between and upon each side of said idler gears and bearing upon two sides or portions of said external helical worm gear and said driven shaft.

10. The invention as defined in claim 8, and wherein said driven shaft, two external helical gears fixed thereon, a plurality of idler gears in mesh and arranged about one of said external worm gears, a portion of said idlers being in mesh and engaged with said driving gear, a second plurality of idler gears in mesh with and arranged about the other said external worm gear and in a manner whereby the plane of rotation of each idler is parallel with one idler of said first plurality of idlers and each idler of said second plurality of idlers in mesh with and driven by one idler of said first plurality of idlers, the diameter of said second plurality of idlers being less than the diameter of said first plurality of idlers, an idler gear carrier coaxially positioned on said driven shaft for rotation in respect thereof, both said pluralities of idlers positioned upon said carrier.

11. The invention as defined in claim 8, and wherein said driven shaft, two external worm gears fixed thereon, two pluralities of idler gears and one each in mesh with and arranged about one each of said external worm gears, a portion of each plurality of idler gears in mesh and engaged with said driving gear, an idler carrier coaxially positioned with said driven shaft and free to rotate with respect thereto, said pluralities of idler gears supported in said carrier for rotation with respect thereto.

12. The invention as defined in claim 11, and wherein one of said plurality of idler gears in mesh with and arranged about one of said external worm gears, the other said plurality of idler gears in mesh with and arranged about the other said external worm gear in a manner whereby the plane of rotation of each idler gear of the second said plurality of idler gears is not parallel to the plane of rotation of each idler gear of the first said plurality of idler gears and wherein the variance of the plane of rotation, of each idler of said second plurality of gears with respect to the plane of rotation of each idler of said first plurality of gears, provides identical speed ratios in both the second said plurality of idlers and in the first said plurality of idlers with respect to said driving gear and said driven shaft, the number of teeth in each idler of said second plurality of idlers being less than the number of teeth in said first plurality of idlers.

13. The invention as defined in claim 8, and wherein said driven gear asembly is positioned within the circumferential surface of the driving gear.

14. The invention as defined in claim 13, and wherein said driving shaft, an external helical gear fixed thereto, an internal helical gear secured to one end of said driving gear, said external helical gear in mesh with said internal helical gear, said driving gear supported by a coaxial carrier for rotation with respect thereto, bearings disposed between said carrier and driving gear, a housing positioned about said carrier, said housing perforated to receive said driving and driven shafts, said housing supporting said driven and driving shafts, said means for changing the relative positions of the driven and driving gears being within the housing.

15. The invention as defined in claim 14, and wherein said arcurate movement caused by action of two rotatable screws mounted to have one on each side of said driving gear carrier, said screws rotatable within respective yokes, said yokes movably secured to said driving gear carrier and longitudinally slidable within guideways, said guideways secured to said housing, means to drive one of said screws at a greater speed relative to the other said screw, a common source of power shaft rotatable to said screws the movement thereof causing said arcuate movement of said driving gear.

16. In a variable speed gear transmission, a driving shaft, a driving gear, a driven shaft, a driven gear, means for connecting each of said shafts to its respective gear, one of said gears having surface disposed between circle of different diameters, said surface provided with curved gear teeth disposed in a manner whereby the shape of said curve gradually varies as the length of said teeth increases, said teeth having uniform size and equidistant spacing between consecutive teeth, means for movably supporting said shafts, means for movably supporting said gears so as to establish portions of said gears in mesh and at increasingly graduated plane of rotation angles in respect to each other for steplessly varying the ratios of turn between said shafts.

17. In an infinitely variable speed gear transmision, a driving assembly constructed of a shaft, a gear and means for connection to said driving shaft, a driven assembly constructed of a shaft, a gear and means for connection to said driven shaft, the gear of one said assembly having a surface comprised of gear teeth curved lengthwise throughout their lengths disposed between parallel circles of different diameter, the shape of said curve gradually changing as the diameter of said gear surface changes and in a manner to maintain uniform size and equidistant spacing between consecutive teeth throughout their lengths, the gear of the other said assembly constructed of a plurality of gears, means for movably supporting said shafts, means for movably supporting and disposing said gears of said assemblies so as to make portions of their respective teeth engage with parallel teeth surfaces for increasingly changing the angles of planes of rotation of said gears causing infinite change of speed ratios between said shafts until one is neutralized.

References Cited

UNITED STATES PATENTS

| 896,161 | 8/1908 | Ross | 74—752 |
|---|---|---|---|
| 1,195,831 | 8/1916 | Marcellot | 74—325 |
| 1,227,985 | 5/1917 | Weigel. | |
| 1,546,944 | 7/1925 | Schiller | 74—348 |
| 1,694,028 | 12/1928 | Wildhaber | 74—458 |
| 1,904,319 | 4/1933 | Marolf | 74—750 |
| 2,028,148 | 1/1936 | Elbertz | 74—458 X |
| 2,470,390 | 5/1949 | Consier | 74—793 X |

FOREIGN PATENTS

| 325,592 | 9/1920 | Germany. |
|---|---|---|
| 17,443 | 1905 | Great Britain. |

ROBERT M. WALKER, *Primary Examiner.*

THOMAS C. PERRY, *Assistant Examiner.*

U.S. Cl. X.R.

74—348, 425.5, 458